(12) United States Patent
Petzinger

(10) Patent No.: US 10,355,326 B2
(45) Date of Patent: *Jul. 16, 2019

(54) BATTERY COOLING METHOD AND SYSTEM

(71) Applicant: Federal Express Corporation, Memphis, TN (US)

(72) Inventor: Mark Richard Petzinger, Atoka, TN (US)

(73) Assignee: Federal Express Corporation, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/199,041

(22) Filed: Jun. 30, 2016

(65) Prior Publication Data

US 2016/0315361 A1 Oct. 27, 2016

Related U.S. Application Data

(62) Division of application No. 13/542,527, filed on Jul. 5, 2012, now Pat. No. 9,406,917.

(Continued)

(51) Int. Cl.
*H01M 2/10* (2006.01)
*H01M 10/613* (2014.01)
(Continued)

(52) U.S. Cl.
CPC ............ *H01M 10/613* (2015.04); *A62C 3/00* (2013.01); *A62C 3/06* (2013.01); *A62C 3/07* (2013.01);
(Continued)

(58) Field of Classification Search
None
See application file for complete search history.

(56) References Cited

U.S. PATENT DOCUMENTS 5,226,555 A   7/1993 Kovaleski
6,474,498 B1  11/2002 Markham
(Continued)

FOREIGN PATENT DOCUMENTS

CN    1557516 A    12/2004
CN  101682186 A     3/2010
(Continued)

OTHER PUBLICATIONS

Extended European Search Report dated Dec. 16, 2016, issued by the European Patent Office in European application No. 16188582.7 (7 pages).

(Continued)

*Primary Examiner* — Jonathan Crepeau
(74) *Attorney, Agent, or Firm* — Finnegan, Henderson, Farabow, Garrett & Dunner, L.L.P.

(57) ABSTRACT

An apparatus may store at least one object including at least one top end and at least one bottom end. The apparatus may include a container configured to store the at least one object and a pouch containing a liquid. The pouch may be configured to substantially cover the at least one top end of the at least one object when stored inside the container. The pouch may be configured to contact the at least one top end of the at least one object and to open when contacted by contents expelled from the at least one object due to thermal runaway.

9 Claims, 6 Drawing Sheets

Related U.S. Application Data

(60) Provisional application No. 61/505,401, filed on Jul. 7, 2011.

(51) Int. Cl.
| | | |
|---|---|---|
| *H01M 10/62* | (2014.01) | |
| *H01M 10/6567* | (2014.01) | |
| *A62C 3/00* | (2006.01) | |
| *A62C 3/07* | (2006.01) | |
| *H01M 10/625* | (2014.01) | |
| *H01M 10/6569* | (2014.01) | |
| *H01M 10/643* | (2014.01) | |
| *H01M 10/623* | (2014.01) | |
| *H01M 10/655* | (2014.01) | |
| *H01M 10/48* | (2006.01) | |
| *H01M 10/0525* | (2010.01) | |
| *A62C 3/06* | (2006.01) | |

(52) U.S. Cl.
CPC ....... *H01M 2/1077* (2013.01); *H01M 2/1094* (2013.01); *H01M 10/0525* (2013.01); *H01M 10/486* (2013.01); *H01M 10/623* (2015.04); *H01M 10/625* (2015.04); *H01M 10/643* (2015.04); *H01M 10/655* (2015.04); *H01M 10/6567* (2015.04); *H01M 10/6569* (2015.04)

(56) References Cited

U.S. PATENT DOCUMENTS

| | | | |
|---|---|---|---|
| 8,448,810 B2 | 5/2013 | Kelly et al. | |
| 9,406,917 B2 * | 8/2016 | Petzinger | H01M 2/1077 |
| 2007/0037050 A1 | 2/2007 | Rigobert et al. | |
| 2011/0262801 A1 | 10/2011 | Schwab | |
| 2012/0171529 A1 | 7/2012 | Sugita et al. | |
| 2012/0231317 A1 | 9/2012 | Shimizu et al. | |
| 2012/0312562 A1 | 12/2012 | Woehrle et al. | |

FOREIGN PATENT DOCUMENTS

| | | |
|---|---|---|
| EP | 2 159 894 A1 | 3/2010 |
| JP | 2003-190312 | 7/2003 |
| JP | 2010-097836 A | 4/2010 |
| WO | WO 2004/080820 | 9/2004 |
| WO | WO 2011/015411 | 2/2011 |

OTHER PUBLICATIONS

Examination Report dated Jul. 21, 2015, issued by the European Patent Office in corresponding European Patent Application No. 12735181.5 (6 pages).

International Search Report and Written Opinion issued in PCT International Application No. PCT/US2012/045768, dated Nov. 8, 2012 (10 pages).

First Office Action dated Aug. 5, 2015, received from the Chinese patent office in corresponding Chinese Application No. 201280033733.4 (10 pages).

Second Office Action dated Apr. 15, 2016, received from the Chinese patent office in corresponding Chinese Application No. 201280033733.4 (4 pages).

* cited by examiner

BATTERY COOLING METHOD AND SYSTEM

PRIORITY

This application is a divisional of application Ser. No. 13/542,527, filed Jul. 5, 2012, which claims the benefit of priority from U.S. Provisional Application No. 61/505,401, filed Jul. 7, 2011. The content of each of the above-mentioned applications is herein incorporated by reference in its entirety.

FIELD

The present disclosure relates generally to a cooling method and system, and more particularly, to a battery cooling method and system.

BACKGROUND

Batteries, such as lithium or lithium-ion batteries, may experience thermal runaway under certain conditions, e.g., when defective, damaged, overcharged, overheated, etc. When a battery experiences thermal runaway, the battery may increase in temperature until the battery vents hot, pressurized gases (e.g., at approximately 450 to 500 degrees Fahrenheit). While venting gas, the battery may continue to increase in temperature (e.g., up to approximately 1,000 to 1,050 degrees Fahrenheit). Jets of flaming materials (e.g., flaming liquid electrolyte) and/or smoke may also be produced and vented from the battery. Sufficient heat, gases, and/or flames may be produced to lead to the combustion and destruction of materials in close proximity to the battery, such as the package surrounding the battery.

Multiple batteries are often stored and packaged together in a single package for transport and/or other applications. However, when one battery in the package experiences thermal runaway, the high heat, gases, and/or flames produced by the battery may contact and/or heat adjacent batteries in the same package, causing the adjacent batteries to overheat and experience thermal runaway as well. A chain reaction may occur as each battery experiencing thermal runaway may cause adjacent batteries to also experience thermal runaway. Thus, if a battery undergoing thermal runaway is surrounded by one or more additional batteries in a package, then a single thermal runaway event may lead to the thermal runaway of multiple batteries which, in turn, may lead to more extensive collateral damage. For example, the package containing the batteries may be destroyed, and when multiple batteries are undergoing thermal runaway, temperatures up to approximately 2,500 degrees Fahrenheit may be reached. Thus, thermal runaway is a concern since a single incident in one battery may lead to significant property damage and, in some circumstances, bodily harm or loss of life.

The disclosed method and system is directed to overcoming one or more of the problems set forth above.

SUMMARY

In accordance with one example, an apparatus for storing at least one object including at least one top end and at least one bottom end includes a container configured to store the at least one object. The apparatus also includes a pouch containing a liquid and configured to substantially cover the at least one top end of the at least one object when stored inside the container. The pouch is configured to contact the at least one top end of the at least one object and to open when contacted by contents expelled from the at least one object due to thermal runaway.

In accordance with another example, a method of storing at least one object having at least one top end and at least one bottom end includes placing the at least one object into a container. The method also includes placing a pouch containing a liquid on the at least one top end of the at least one object such that the pouch substantially covers the at least one top end of the at least one object. The pouch includes a layer configured to contact the at least one top end of the at least one object and formed from a material having a melting point of less than approximately 400 degrees Fahrenheit.

In accordance with a further example, a method of storing a plurality of objects having top ends and bottom ends includes placing the plurality of objects into a container. The plurality of objects are parallel such that the top ends of the plurality of objects are aligned and the bottom ends of the plurality of objects contact a surface of the container. The method also includes placing a pouch containing a liquid on the top ends of the plurality of objects such that the pouch substantially covers the plurality of objects. The pouch is configured to contact the top ends of the plurality of objects and to open when contacted by contents expelled from at least one of the plurality of objects due to thermal runaway.

In accordance with yet another example, a container defining a cavity and configured to transport objects includes a fluid and at least one sealed enclosure. The sealed enclosure is configured to (i) contain the fluid, (ii) substantially cover a top end of at least one object in the container, (iii) make contact with the top end of the at least one object, and (iv) release the fluid when a content from the at least one object is expelled.

It is to be understood that both the foregoing general description and the following detailed description contains examples only and is not restrictive of the invention.

DETAILED DESCRIPTION

Figure 1:
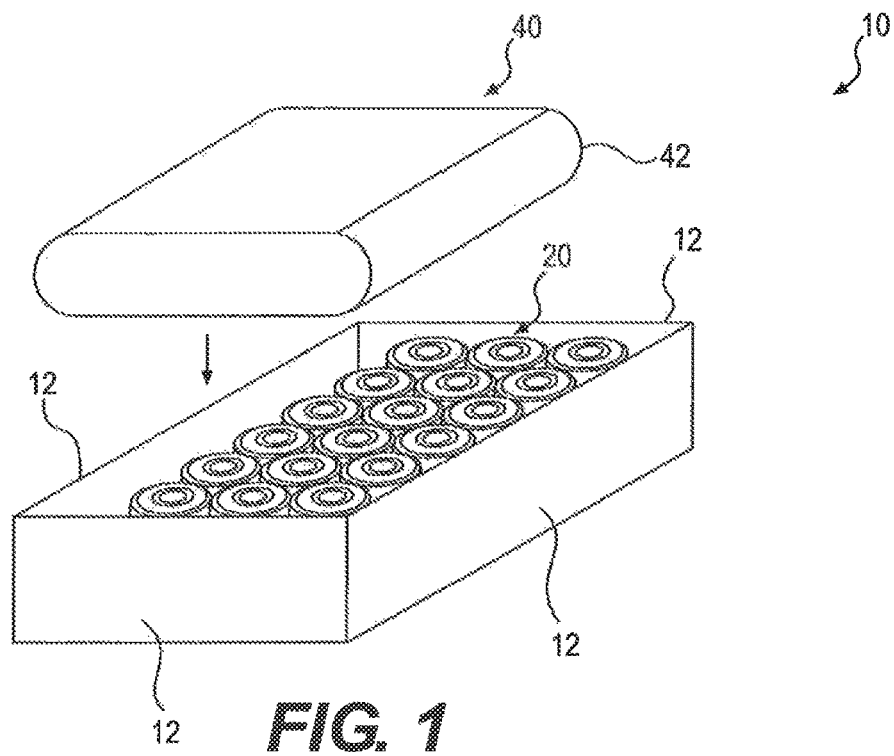
FIG. 1 is a perspective view of the assembly of a container including a pouch and multiple batteries, according to an example embodiment.

Reference will now be made in detail to example embodiments that are illustrated in the accompanying drawings. Wherever possible, the same reference numbers will be used throughout the drawings to refer to the same or like parts.

FIGS. 1-4 illustrate an example container 10 for storing one or more batteries 20, e.g., during transport or for other applications. The container 10 may include at least one side wall 12 and a bottom surface 14 that define a space in which to store the batteries 20. In the example embodiment shown in FIG. 1, the container 10 is a rectangular prism including four side walls 12, but the number of side walls 12 may vary depending on the shape of the container 10. Further, the container 10 may have at least a partially opened top (e.g., no lid) or may include a closeable lid.

The container 10 may be formed from various types of materials. In the example embodiment shown in FIGS. 1-4, the container 10 is formed from corrugated cardboard. Alternatively, the container 10 may be formed from other materials typically used as packaging materials, such as other types of cardboard, paper, plastic, and/or other generally stiff and/or foldable materials. The materials may be treated with wax, polymers, waterproof substances, oilproof substances, etc., as known in the art.

The batteries 20 may include any type of battery. For example, the batteries 20 may include any of a variety of different chemistries and configurations including, but not limited to, lithium, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, alkaline, or other battery type/configuration. Further, the batteries 20 may include any combination of batteries of the variety of different chemistries.

Any number of batteries 20 may be stored in the container 10, for example, depending on the size of the container 10. In the example embodiment shown in FIGS. 1-4, multiple batteries 20 are stored in the container 10. Alternatively, any number of batteries 20 ranging from 1 to over 1,000 may be stored in the container 10. Also, when the container 10 stores multiple batteries 20, the batteries 20 may be stored adjacent to each other and contacting each other, as shown in FIGS. 1-4. Alternatively, one or more spacers 13 (FIGS. 8 and 9) may be provided to space the batteries 20 from each other and/or the side was 12. The batteries 20 may be placed in various known configurations for storing batteries 20.

Figure 2:
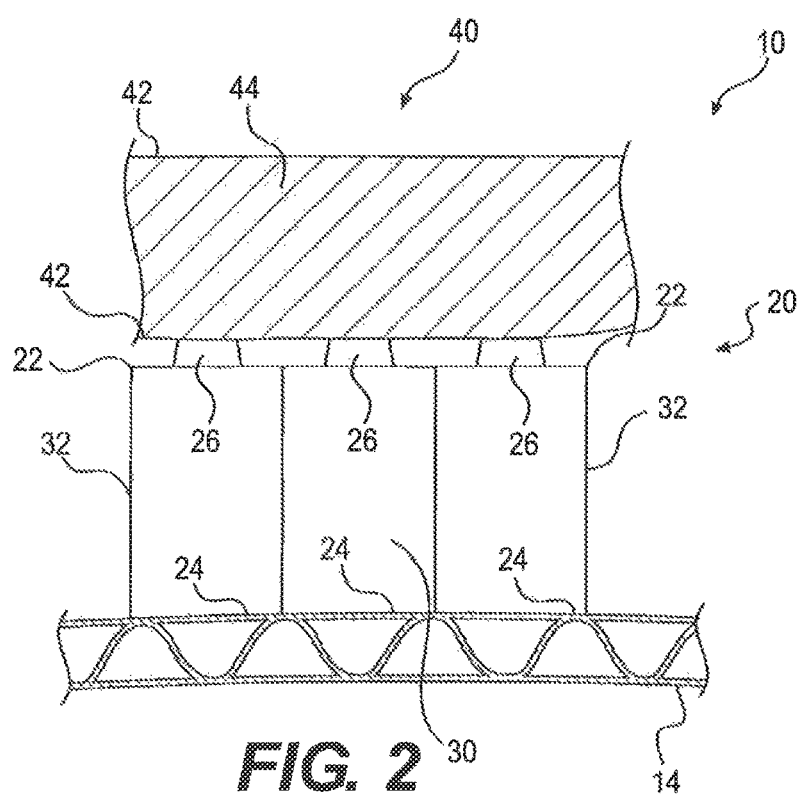
FIG. 2 is a cross-sectional view of the container of FIG. 1.
Figure 3:
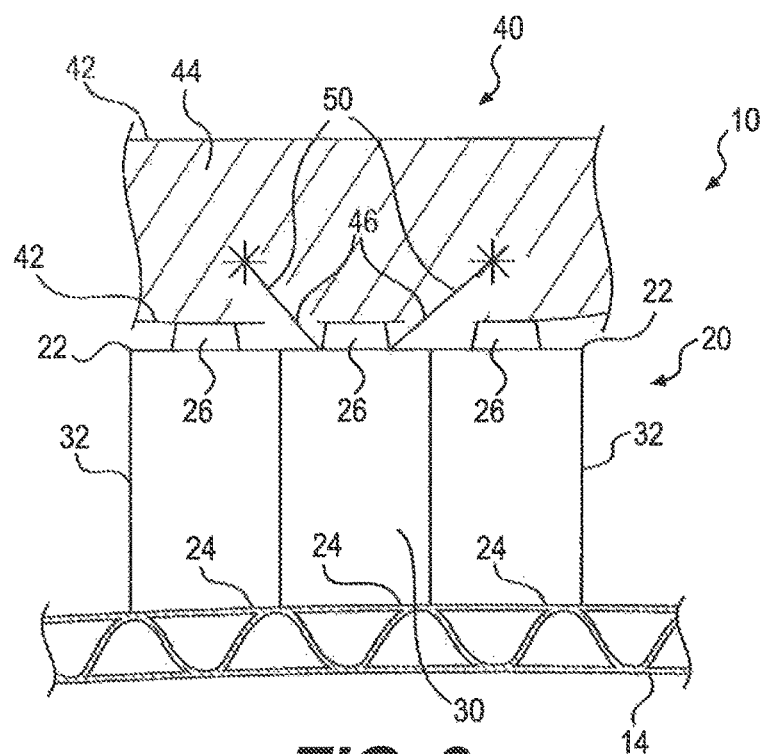
FIG. 3 is a cross-sectional view of the container of FIG. 1 with a venting battery.
Figure 4:
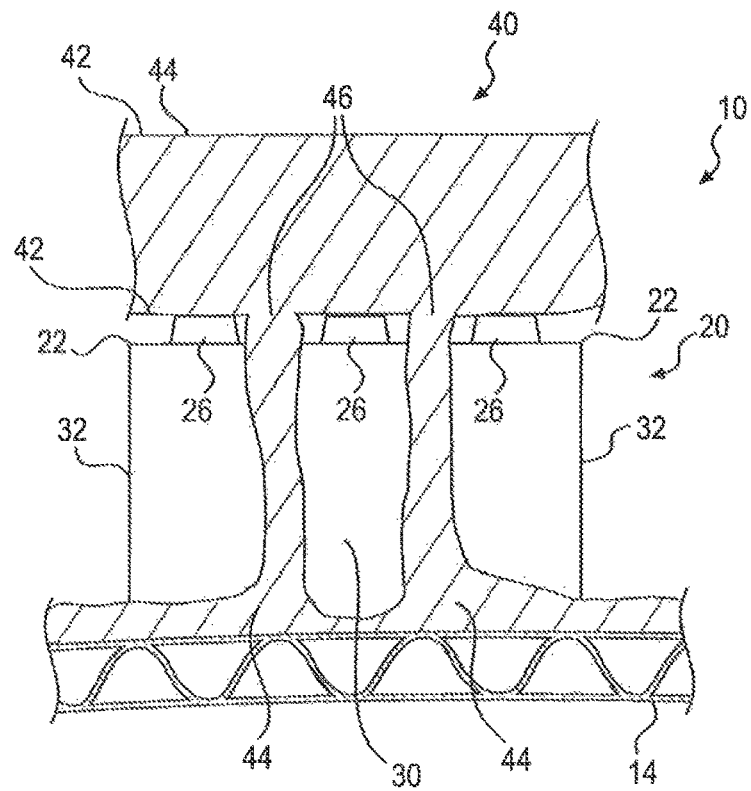
FIG. 4 is a cross-sectional view of the container of FIG. 1 in which the pouch is opened.

Each battery 20 may include a top end 22 and a bottom end 24. For example, as shown in FIGS. 1-4, the top end 22 may include a positive terminal, e.g., formed as a cylindrical protrusion (button) 26 extending from a casing of the battery 20, and a vent or relief port (not shown) as known in the art. The batteries 20 may be placed inside the container 10 such that the bottom ends 24 of the batteries 20 contact and rest on the bottom surface 14 of the container 10, as shown in FIGS. 2-4. The top ends 22 of the batteries 20 may also be aligned with each other.

A pouch 40 may be placed on top of the batteries 20 in the container 10, and may contact and rest on the batteries 20. For example, as shown in FIGS. 1-4, the pouch 40 may be placed on top of and rest on the top ends 22 of the batteries 20. The pouch 40 may be sized (e.g., length and width) to substantially cover the batteries 20, or to substantially cover at least a majority of the top ends 22 of the batteries 20. In one embodiment, the pouch 40 may have substantially the same (or slightly smaller) length and width as the space formed by the container 10, and may be disposed inside the container 10 with the batteries 20. Although the size of the pouch 40 depends on the size of the batteries 20, the size of the pouch 40 may range, for example, from approximately three inches by approximately three inches to approximately two feet by approximately two feet. Alternatively, the length and/or the width of the pouch 40 may be smaller or larger.

The height of the pouch 40 may depend on the contents of the pouch 40 as will be described below. For example, the height may be approximately one to two inches. Alternatively, the height of the pouch 40 may be smaller or larger.

The pouch 40 may include a sealed cavity defined within a film or layer 42 of material. The sealed cavity formed in the pouch 40 may contain a fluid 44. For example, the pouch 40 may be a flexible container that may be closed or sealed (e.g., using an impulse sealer) to hold, store, or carry the fluid 44. The layer 42 may be formed of any material used to form plastic bags or other types of flexible bags known in the art, such as polyethylene, polystyrene, polypropylene, polyurethane, polylined bags, polyvinyl acetate (PVA), polyvinylidene chloride (e.g., cling or plastic wrap), nylon, etc.

The layer 42 may be formed of a material having a relatively low melting point. For example, the layer 42 may be capable of melting at temperatures within the range of, e.g., less than approximately 400 degrees Fahrenheit, less than approximately 300 degrees Fahrenheit, less than approximately 200 degrees Fahrenheit, less than approximately 180 degrees Fahrenheit, any range between these temperatures, etc. Also, the layer 42 may have a thickness similar to the thickness of a layer used to form plastic bags or other types of flexible bags known in the art, such as a thickness in the range of approximately 0.0005 inches to approximately 0.005 inches.

The fluid 44 may include a gas (e.g., air, etc.) and/or a liquid (e.g., water, etc.). In one example embodiment, the pouch 40 may contain approximately 100% water. In another example embodiment, the pouch 40 may contain approximately 95% to approximately 98% water or other liquid, and the remaining approximately 2% to approximately 5% may include another substance. Other substances may be used to increase the viscosity, evaporation time, cooling, and/or fire extinguishing and/or fire retardant characteristics of the fluid 44. The other substances may include a gel, polymer, etc. For example, sodium polyacrylate is a powder that may absorb water to form a gel that acts as a thickening agent.

The layer 42 of the pouch 40 serves as a barrier between the fluid 44 in the pouch 40 and the top ends 22 of the batteries 20, and may open when contacted by contents expelled from any of the batteries 20. For example, FIG. 2 shows three of the batteries 20 stored in the container 10 of the example embodiment with the pouch 40 located above the batteries 20. The three batteries 20 include a first battery 30 and two batteries 32 adjacent to the first battery 30.

The first battery 30 may undergo thermal runaway, thereby causing, among other things, the first battery 30 to increase in temperature and/or expel or vent contents 50 from within the first battery 30, such as flames and/or jets of fluids (e.g., gases or liquids, such as liquid electrolyte). FIG. 3 shows the first battery 30 venting contents 50 from within the first battery 30.

Due to the thermal runaway, the first battery 30 and/or the vented contents 50 may reach a temperature that is approximately equal to or greater than the melting point of the material forming the layer 42 of the pouch 40, the temperature of the fluid 44 in the pouch 40 may increase sufficiently to cause the pressure inside the pouch 40 to rupture the layer 42, and/or the vented contents 60 may be expelled with enough force to rupture the layer 42. Due to the melting and/or rupture described above, one or more openings 46 may form in the layer 42 of the pouch 40, thereby causing the fluid 44 to leak from the pouch 40.

FIG. 4 shows the fluid 44 released from the pouch 40 through the openings 46 formed in the layer 42. The openings 46 may be located generally above the first battery 30. As shown in FIG. 4, the openings 46 may also be located generally above other batteries 32 adjacent to the first battery 30 and/or within the container 10. Thus, the fluid 44 may substantially coating and cool the first battery 30 and/or the other batteries, e.g., through evaporation. The fluid 44 may flow into the first battery 30, around the batteries 30, 32, and then evaporate. As a result, the fluid 44 may cool the first battery 30 experiencing thermal runaway and/or the other batteries 32 in order reduce the heat and/or combustion occurring due to the thermal runaway of the first battery 30, and/or to assist in preventing the other batteries 32 from undergoing thermal runaway, which may lead to a chain reaction.

As noted above, in one example, the amount of fluid 44 contained in the pouch 40 depends on the size and number of batteries 20 to be placed underneath the pouch 40, and/or the amount of fluid predicted to sufficiently cool the first battery 30 and/or the other batteries 32 and/or assist in preventing a chain reaction. Similarly, the height of the pouch 40 may depend on the amount of fluid 44 contained in the pouch 40.

Also, as noted above, in one example, the composition of the fluid 44 includes substances to increase the resistance to flow of the fluid 44 (e.g., a gel, a substance that forms a gel, other thickening agents, etc.). As a result, the fluid 44 may flow over the batteries 20 more slowly, which may cool the batteries 20 more effectively, instead of washing past the batteries 20 relatively quickly. The fluid 44 may have also have a low enough resistance to flow to permit the fluid 44 to flow sufficiently around the batteries 20.

Figure 5:
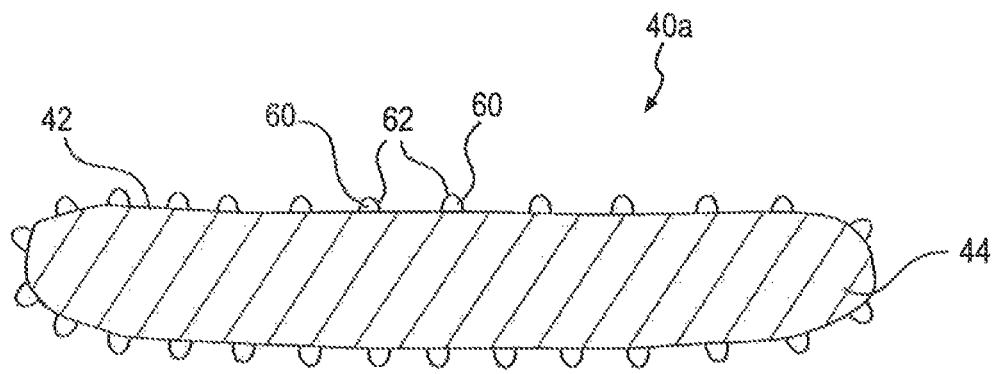
FIG. 5 is a cross-sectional view of a pouch formed with sheet material encapsulating air pockets, according to an example embodiment.

FIG. 5 shows a pouch 40a including the layer 42 and the fluid 44 described above. The pouch 40a may also be formed with sheet material including air pockets 60, according to another example embodiment. For example, the pouch 40a may be formed using sheet material commonly referred to as "bubble wrap" with the bubbles of the bubble wrap being formed by layers 62 encapsulating the air pockets 48. The layers 62 may be similar (e.g., in thickness and materials) to the layer 42 described above. The bubble wrap may be sealed at the edges of the layer 42 to form the pouch 40a and may contain the fluid 44. Thus, the air pockets 48 may be formed between the layers 42, 62. The pouch 40a may be positioned on the batteries 20 such that fluid 44 is separated from the batteries 20 by a barrier formed by the layers 42, 62 and the air pockets 48. Alternatively, instead of multiple air pockets $0, the pouch 40a may be formed with a single air pocket 60 separating the fluid 44 from the batteries 20.

With this configuration, when the battery experiencing thermal runaway (e.g., the first battery 30) heats, the heat from the battery is transferred to the air pockets 60 first instead of directly to the fluid 44. Then, the battery experiencing thermal runaway may reach a temperature that causes the battery to expel the contents 50 and/or melt the layers 42, 62 enough to form the opening 46 that releases the fluid 44 to coat the batteries 20.

Figure 6:
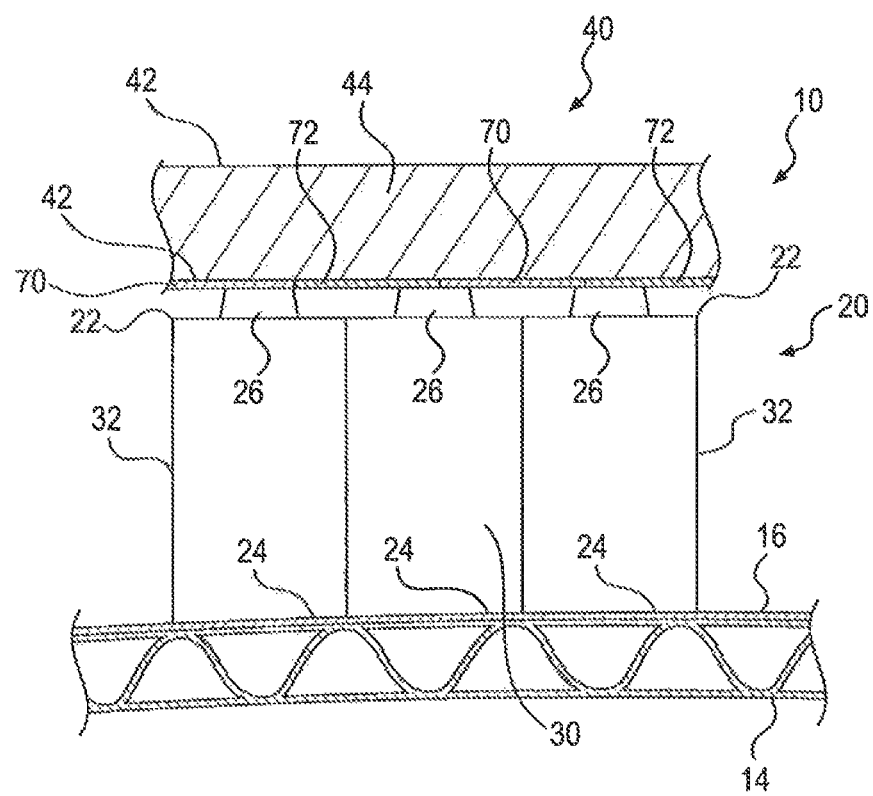
FIG. 6 is a cross-sectional view of a container including a waterproof layer, according to an example embodiment.

FIG. 6 shows the container 10 including a waterproof layer 16, according to another example embodiment. For example, the waterproof layer 16 may be a coating, such as a plasticized coating, applied to the interior surfaces of the side ways 12 and/or the bottom surface 14 of the container 10. Alternatively, the waterproof layer 16 may be formed as a tray, such as a plastic tray having a shape that substantially corresponds to the shape of the interior surfaces of the side walls 12 and/or the bottom surface 14 of the container 10. The plastic tray may be inserted into the container 10 before placing the batteries 20 and the pouch 40 in the container 10.

The waterproof layer 16 may prevent the fluid 44 released from the pouch 40 from being absorbed into the container 10. When the fluid 44 is absorbed into the container 10, the fluid 44 may not coat the batteries 20 long enough to cool the batteries 20 sufficiently. Also, the waterproof layer 16 may prevent the container 10 from being damaged and/or weakened, from leaking the fluid 44 into the surrounding environment, etc.

Further, in another example embodiment, the container 10 may include one or more components 70 and one or more sensors 72 connected to the pouch 40, such as the layer 42 of the pouch 40 or other portion of the pouch 40 contacting the batteries 20. In the example embodiment shown in FIG. 6, multiple components 70 and sensors 72 form a continuous layer affixed to a bottom surface of the layer 42 of the pouch 40. Alternatively, one or more components 70 and one or more sensors 72 may be spaced from each other on a bottom surface the layer 42 of the pouch 40. For example, the spacing and number of the components 70 and/or sensors 72 may depend on a size and/or number of batteries 20 to be stored below the pouch 40 such that at least one component 70 and at least one sensor 72 may be located generally near each battery 20. As another alternative, the component(s) 70 and/or the sensor(s) 72 may be formed inside the pouch 40, such as an upper surface of the layer 42 so that the layer 42 forms a barrier between the batteries 20 and the component(s) 70 and/or the sensor(s) 72.

The sensors 72 may detect thermal runaway. For example, the sensors 72 may detect a temperature change that is above a predetermined threshold, such as 180 degrees Fahrenheit, 200 degrees Fahrenheit, 300 degrees Fahrenheit, 400 degrees Fahrenheit, or another temperature threshold. Alternatively, the sensors 72 may detect a predetermined amount of a substance expelled by a battery undergoing thermal runaway, such as a gas or liquid expelled by the battery (e.g., electrolyte, carbon dioxide, hydrogen gas, carbon monoxide, methane, ethane, ethylene, etc). As another alternative, the sensors 72 may detect a predetermined amount of force transmitted from the contents 50 that are vented from a battery undergoing thermal runaway.

Upon detection of thermal runaway by the sensors 72, the components 70 may cause the fluid 44 in the pouch 40 to be released. For example, the components 70 may burst or make a hole or other opening in the layer 42 or other portion of the pouch 40. For example, the components 70 may include a valve or other device configured to open and/or close when actuated.

Figure 7:
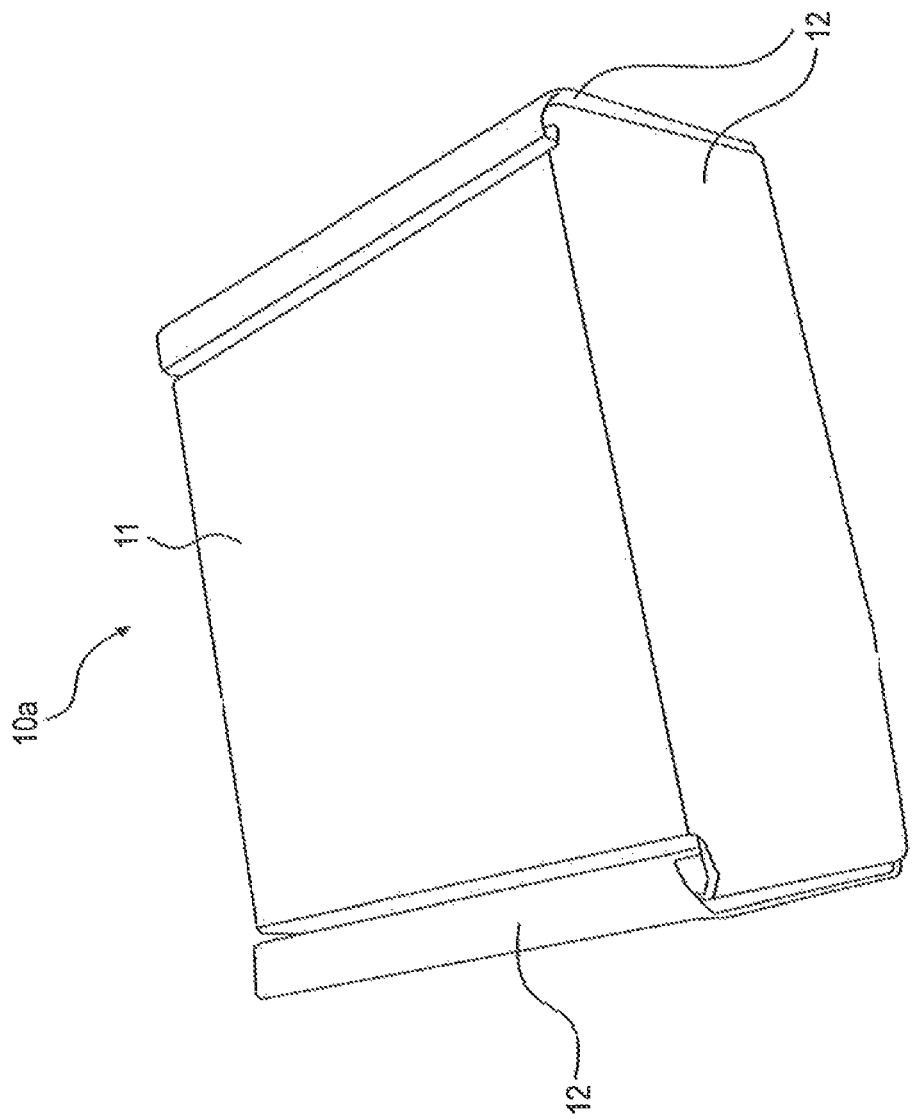
FIG. 7 is a perspective view of a container, according to another example embodiment, with a closed lid.
Figure 8:
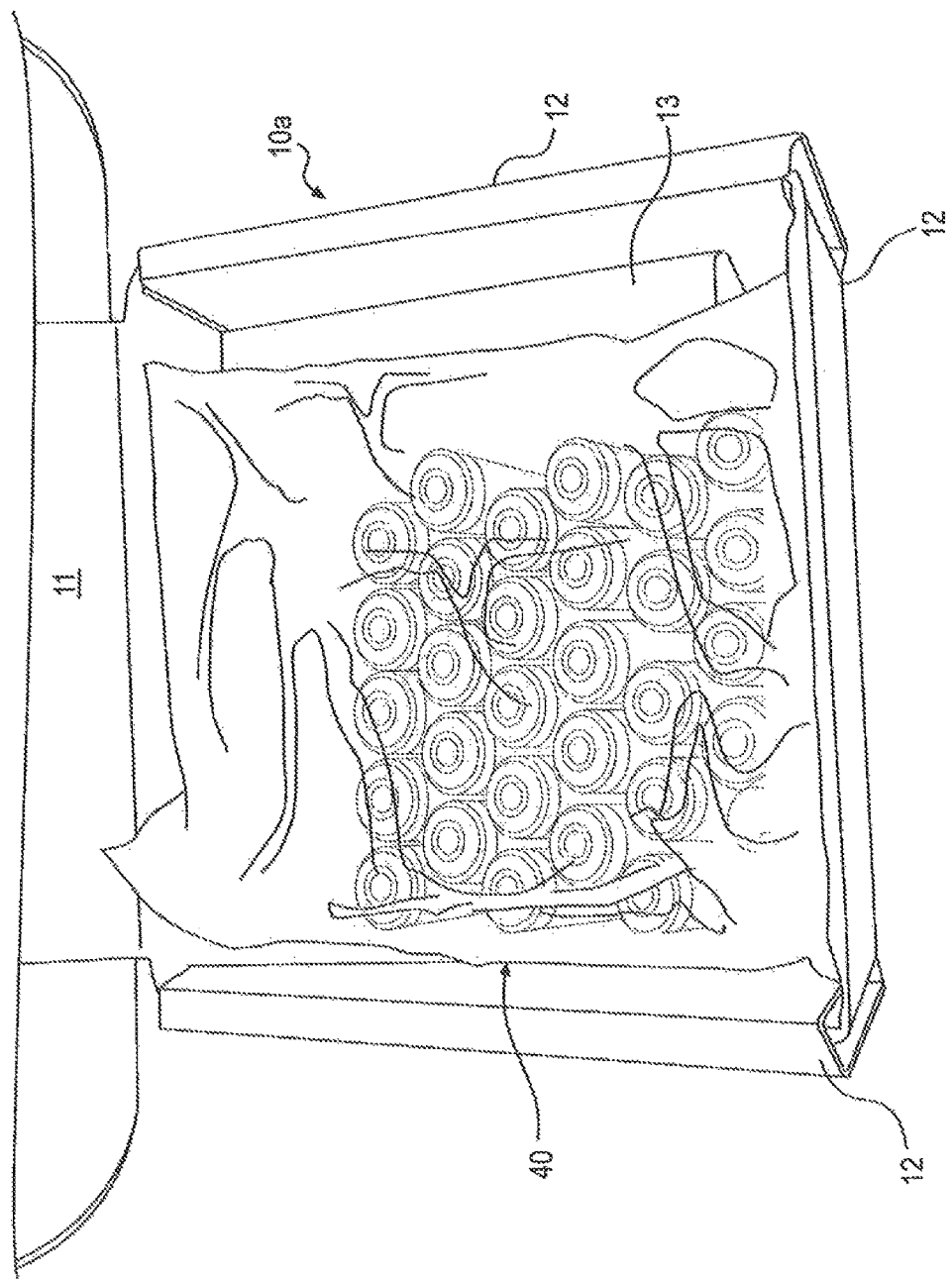
FIG. 8 is a perspective view of the container of FIG. 7 with an opened lid, and including a pouch and multiple batteries.
Figure 9:
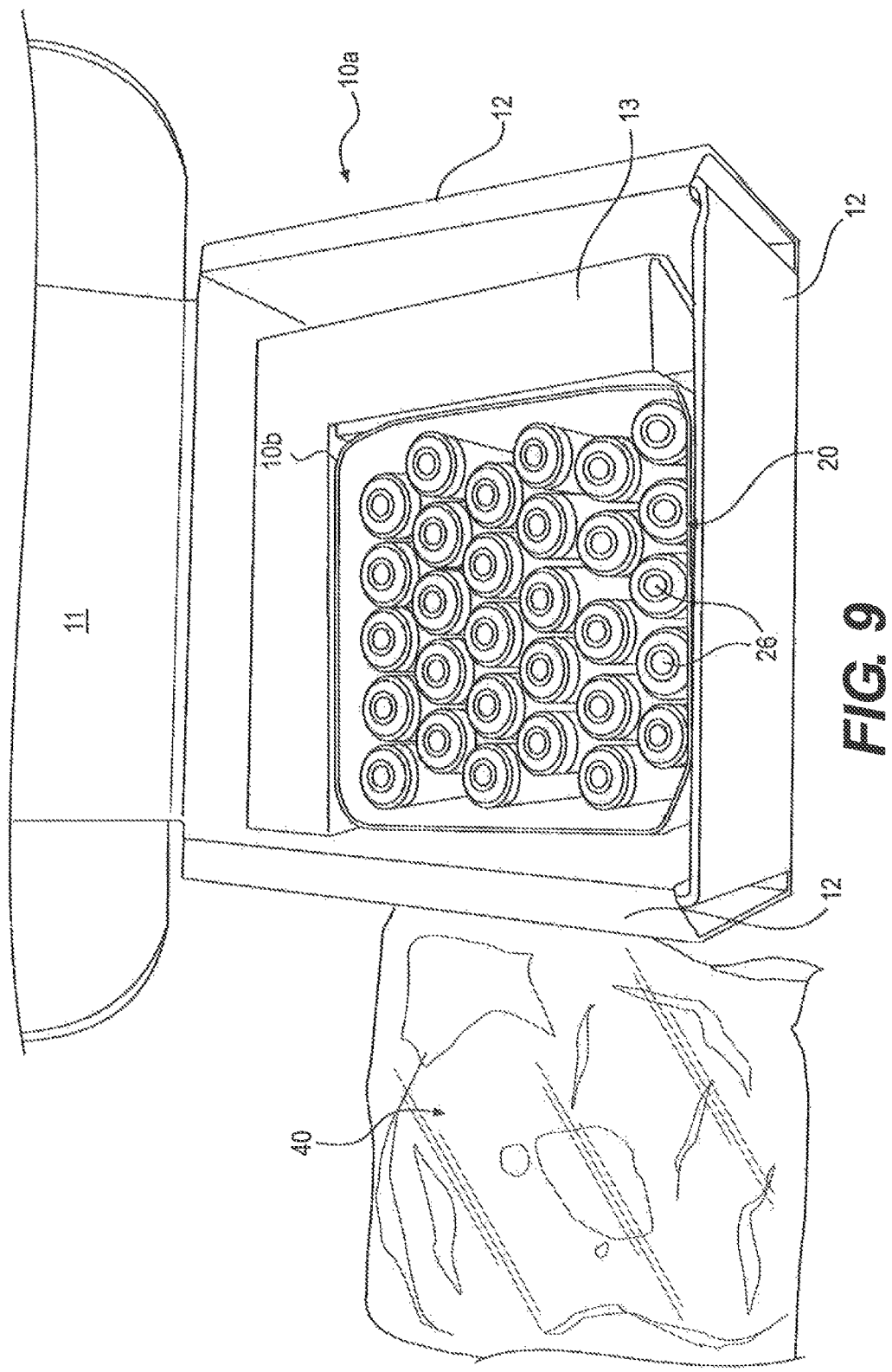
FIG. 9 is a perspective view of the container of FIG. 7 with an opened lid and the pouch removed.

FIGS. 7-9 show a container 10a including a lid 11 according to another example embodiment. FIG. 7 shows the container 10a with the lid 11 closed. FIG. 8 shows the container 10a with the lid 11 opened, and the pouch 40 and the batteries 20 are stored inside the container 10a. FIG. 9 shows the container 10a with the lid 11 opened, and the pouch 40 removed from the container 10a. Optionally, the batteries 20 may be placed in a separate, more tightly fitting container 10b inside the container 10a. Also, the spacer 13 may be provided to create a fighter fit inside the container 10a, which may keep the batteries 20 parallel, side-by-side, and/or upright, as shown in FIG. 9.

The containers 10, 10a described above allow one or more batteries 20 to be transported and/or stored with less risk of property damage and/or bodily harm. If one of the batteries 20 undergoes thermal runaway, the battery as well as the adjacent batteries may be cooled in order to reduce the heat and minimize the damage from the contents expelled from the battery undergoing thermal runaway, reduce the likelihood of creating a chain reaction in the other batteries, etc.

It will be apparent to those skilled in the art that various modifications and variations can be made to the methods and systems described above. Other embodiments will be apparent to those skilled in the art from consideration of the specification and practice of the disclosed methods and systems. It is intended that the specification and examples be considered as exemplary only, with a true scope being indicated by the following claims and their equivalents.

What is claimed is:

1. A container defining a cavity, the container comprising:
   at least one object;
   a fluid; and
   at least one sealed enclosure located within the container, the sealed enclosure being defined by an outer wall, the sealed enclosure being configured to
   (i) contain the fluid,
   (ii) substantially cover a top end of at least one object in the container,
   (iii) make contact with the top end of the at least one object, and
   (iv) release the fluid when a content from the at least one object is expelled, wherein the outer wall includes at least one air pocket positioned within a thickness of the outer wall and separating the fluid and the at least one object.

2. The container of claim 1, wherein the sealed enclosure is a pouch.

3. The container of claim 2, wherein:
   the at least one object is at least one battery; and
   the sealed enclosure is further configured to release the fluid when the content from the at least one battery is expelled due to thermal runaway.

4. The container of claim 1, wherein the sealed enclosure is a plastic bag.

5. The container of claim 4, wherein:
   the at least one object is at least one battery; and
   the sealed enclosure is further configured to release the fluid when the content from the at least one battery is expelled due to thermal runaway.

6. The container of claim 1, wherein:
   the at least one object is at least one battery; and
   the sealed enclosure is further configured to release the fluid when the content from the at least one battery is expelled due to thermal runaway.

7. The container of claim 1, wherein the outer wall includes:
   an inner layer in contact with the fluid; and
   an outer layer disposed around the inner layer such that the at least one air pocket is formed between the inner layer and the outer layer.

8. The container of claim 1, further including a waterproof layer disposed on an interior surface of the container.

9. The container of claim 1, further including at least one sensor attached to the outer wall.

* * * * *